United States Patent [19]

Himstedt

[11] Patent Number: 5,036,131

[45] Date of Patent: Jul. 30, 1991

[54] PROTECTIVE COATING FOR ELECTRICAL COMPONENTS

[75] Inventor: Alan L. Himstedt, Midland, Mich.

[73] Assignee: Dow Corning Corporation, Midland, Mich.

[21] Appl. No.: 523,967

[22] Filed: May 16, 1990

[51] Int. Cl.$^5$ ................................................ C08J 3/24
[52] U.S. Cl. .................................. 524/786; 524/847; 524/793
[58] Field of Search ..................... 524/847, 786, 793

[56] References Cited

U.S. PATENT DOCUMENTS

| | | | |
|---|---|---|---|
| 3,035,016 | 5/1962 | Bruner | 260/16.5 |
| 3,077,465 | 2/1963 | Bruner | 260/46.5 |
| 3,189,576 | 6/1965 | Sweet | 260/46.5 |
| 3,294,732 | 12/1966 | Nitzsche et al. | 260/37 |
| 3,294,739 | 12/1966 | Weyenberg | 260/46.5 |
| 3,940,360 | 2/1976 | Carder | 524/265 |
| 4,476,155 | 10/1984 | Niemi | 427/58 |
| 4,500,659 | 2/1985 | Kroupa et al. | 523/213 |
| 4,503,210 | 3/1985 | Von Au et al. | 528/33 |
| 4,882,369 | 11/1989 | Maxson | 523/213 |

Primary Examiner—Lewis T. Jacobs
Assistant Examiner—Karen A. Hellender
Attorney, Agent, or Firm—Edward C. Elliott

[57] ABSTRACT

A silicone dispersion, having improved toughness and thixotropic characteristics, cures to an elastomer upon exposure to the air. The dispersion is particularly useful for spraying onto exposed electrical conductors to prevent their shorting out from contact with animals and birds. The dispersion contains a hydroxyl endblocked polydimethylsiloxane, aluminum trihydrate, moisture activated crosslinking agent and catalyst. In order to obtain thixotropy, it also contains a phenyl or 3,3,3 trifluoropropyl-containing hydroxyl endblocked polydiorganosiloxane and untreated fumed silica. The method of making the dispersion is also specified.

13 Claims, No Drawings

PROTECTIVE COATING FOR ELECTRICAL COMPONENTS

BACKGROUND OF THE INVENTION

1. Field of the Invention

This invention relates to a sprayable, room temperature curable, silicone dispersion for use in coating exposed electrical conductors to prevent animals from coming into contact with them.

2. Background Information

One of the causes of electrical outages is the short circuiting of electrical distribution systems by animals and birds, which inadvertently come into contact with exposed electrical conductors. A familiar occurrence is the short circuiting of a transformer by a squirrel.

One of the means of preventing this from happening is the placement of plastic guards of various types over exposed circuits at places where animals or birds are apt to come into contact with them.

A silicone composition intended for coating high voltage insulators in order to improve their electrical performance in wet, contaminated conditions is described in U.S. Pat. No. 4,476,155, issued Oct. 9, 1984. This material has been shown to provide a useful coating, but when diluted so that it can be applied by spraying, only a thin coat can be applied at one time with drying required between coats.

A silicone composition which crosslinks to form an elastomer in the presence of moisture is described in U.S. Pat. No. 4,503,210, issued Mar. 5, 1985. The composition comprises a diorganopolysiloxane having terminal condensable groups and a silicon compound having at least three oxime groups per molecule. Part of the silicon compound is a mixture containing a silane having four oxime groups bonded to a silicon atom via oxygen, and a silane having a hydrocarbon radical bonded to a silicon atom via SiC-bonding and having three oxime groups bonded to the silicon atom via oxygen, or an oligomer of the silane mixture.

SUMMARY OF THE INVENTION

This invention relates to a method of making a silicone dispersion which cures to an elastomer, having improved toughness, upon exposure to the air, the dispersion having a thixotropic character. The dispersion contains a hydroxyl endblocked polydiorganosiloxane, aluminum trihydrate, moisture activated curing system; and in addition, to give the dispersion its thixotropy, a phenyl or 3,3,3-trifluoropropyl containing hydroxyl endblocked polydiorganosiloxane and fumed silica.

The method of this invention produces a thixotropic silicone dispersion which can be sprayed onto a vertical surface in sufficient thickness in one layer to produce a tough coating.

The thixotropic silicone dispersion produced by the method of this invention can be applied in one coating to give a silicone elastomeric coating having sufficient thickness and toughness to prevent the shorting out of electrical equipment so coated by animals or birds.

DESCRIPTION OF THE INVENTION

This invention relates to a method of making a thixotropic silicone dispersion consisting essentially of (A) mixing (1) 100 parts by weight of a hydroxyl endblocked polydimethylsiloxane having a viscosity of from 5 to 20 Pa.s at 25° C. with (2) a siloxane of the formula

where R is methyl or phenyl radical, A is phenyl or 3,3,3-trifluoropropyl radical, x is from 3 to 20, y is from 0 to 17, and at least 30 percent of the total organic radicals are A, the amount used being sufficient to give from 0.25 to 2.5 part of siloxane (2) per part of silica (B), then (B) admixing from 0.24 to 1.5 weight percent, based upon the final weight of the silicone dispersion, of (3) untreated fumed silica, then (C) admixing from 30 to 200 parts by weight of (4) finely ground aluminum trihydrate powder, then (D) admixing from 10 to 100 parts by weight of (5) non-reactive solvent to disperse the mixture, then (E) admixing in the absence of moisture, a moisture activated crosslinking system for polydimethylsiloxane (1) which does not destroy the thixotropic nature of the dispersion.

Of the many moisture activated crosslinking systems known for use in silicone elastomeric systems, preferred crosslinking systems are selected from the group consisting of (A) from 5 to 30 parts by weight of silane (6) of the formula $$R'_b Si(ON=X)_{4-b}$$

in which R' is selected from the group consisting of monovalent hydrocarbon radicals and monovalent halohydrocarbon radicals, X is selected from the group consisting of $R''_2 C=$ and

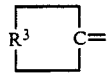

radicals in which R" is selected from the group consisting of monovalent hydrocarbon radicals and monovalent halohydrocarbon radicals and $R^3$ is selected from the group consisting of divalent hydrocarbon radicals and divalent halohydrocarbon radicals and b is an integer from 0 to 1 inclusive, and from 0.2 to 0.5 parts by weight of a condensation catalyst for the reaction of polydiorganosiloxane (1) and silane (6), (B) a silane of the formula $R^4 Si(OAc)_3$ in an amount such that there is at least one mol of silane per mol of silicon-bonded hydroxyl, Ac is a saturated aliphatic monoacyl radical of a carboxylic acid, $R^4$ is selected from the group consisting of monovalent hydrocarbon radicals, halogenated monovalent hydrocarbon radicals, and cyanoalkyl radicals; and a carboxylic acid salt of a metal ranging from lead to manganese inclusive in the electromotive series of metals, and (C) a silane of the formula $R^5_x Si(OR^6)_{4-x}$ in which $R^5$ is a monovalent radical having less than 19 carbon atoms selected from the group consisting of hydrocarbon radicals, halohydrocarbon radicals and cyanoalkyl radicals, $R^6$ is a monovalent radical having less than 5 carbon atoms selected from the group consisting of haloaliphatic hydrocarbon radicals having no halogen atoms alpha to the oxygen atom and aliphatic hydrocarbon radicals, and x has an average value of from 0 to 1 inclusive, present in an amount of at least 1.0 mol of silane per mol of silicon-bonded hydroxyl in (1); and at least 0.1 percent by weight, based upon the weight of (1) of a titanium compound having radicals attached to the titanium atom, and valences of the Ti are satisfied by substituents selected from the group consisting of organic radicals which are attached to the titanium atom through Ti—O—C linkages, —OH and —O— of a Ti—O—Ti linkage.

The method used to produce the silicone dispersion of this invention gives a dispersion which has a very thixotropic character. The dispersion can be sprayed with ordinary commercial spraying equipment. The wet coating formed by this spray quickly forms a coherent film which does not flow. The second and subsequent coatings can be applied without allowing each coating to dry and/or cure between coatings. Succeeding passes of the sprayer can apply successive coatings with no waiting between coats. The thixotropic nature of the coating is due to the presence of the siloxane (2) having hydroxyl endblocking and phenyl or 3,3,3-trifluoropropyl radicals in combination with the fume silica (3); as well as the method used to produce the dispersion. If another order of mixing the ingredients is used, the thixotropic nature of the coating may not be obtained.

The polymer used in the method of this invention is a hydroxyl endblocked polydimethylsiloxane, ingredient (1). The viscosity of the polymer is from 5 to 20 Pa.s at 25° C., with a preferred viscosity of greater than 10 Pa.s and less than 14 Pa.s, both measured at 25° C. A few of the organic radicals of the polymer can be any of those known for use in silicone polymers, such as monovalent hydrocarbon radicals and substituted hydrocarbon radicals, or mixtures of them, but the majority of the radicals are methyl. Methyl is the preferred radical because the method of this invention is dependent upon the incompatibility of siloxane (2) with polydimethylsiloxane (1). It is thought that up to 10 percent of the radicals could be other than methyl without affecting the incompatibility excessively. The preferred polymer is polydimethylsiloxane. The methods of making these polymers and the polymers themselves are well known in the art.

The siloxane, ingredient (2), which is mixed with the polydiorganosiloxane (1) in step (A) of the mixing method, is of the formula $$HO(\underset{A}{\underset{|}{Si}}O)_x(\underset{R}{\underset{|}{Si}}O)_yH$$

where R is methyl or phenyl radical, A is phenyl or 3,3,3-trifluoropropyl radical, x is from 3 to 20, y is from 0 to 17, and at least 30 percent of the total organic radicals are A, the amount used being sufficient to give from 0.25 to 2.5 part of siloxane (2) per part of silica (3). The siloxane (2) is used in this composition in conjunction with untreated fumed silica (3) to impart thixotropic properties to the composition. The siloxane has at least 30 percent of the organic radicals as phenyl or 3,3,3-trifluoropropyl to provide the required incompatibility. Other radicals, such as cyanopropyl or cyanoethyl, which are incompatible with the siloxane (1) are also thought to be suitable. The siloxane (2) is required to have hydroxyl endblocking so that it will react with the untreated fumed silica (3) to treat the surface of the silica so that the silica surface is incompatible with the polymer (1). The siloxane has the designated numbers of siloxy units to provide the proper hydroxyl content, phenyl or 3,3,3-trifluoropropyl content, and viscosity for use in this invention. A preferred siloxane has phenyl radical as A, y equal to zero and x equal to about 4, at which point the viscosity is about 0.5 Pa.s at 25° C. The preferred amount of siloxane is from 0.25 to 2.5 parts per part of silica (3) where the silica has a surface area of from 200 to 250 m$^2$/g. It is thought that sufficient siloxane (2) is needed to treat the untreated fumed silica (3) by reacting with the hydroxyl groups on the silica surface. Theoretically, only about 0.03 part of siloxane (2) would be necessary, but the time required for reaction would be excessive. An excess of siloxane (2) is used to allow treating to occur in a useful time. In the case of treating untreated fumed silica having a surface area of about 250 m$^2$/g and using 0.25 part of methylphenylsiloxane fluid as siloxane (2), the ratio of hydroxyl on siloxane (2) to hydroxyl on silica (3) is about 7.5 to 1. A ratio of about 50 to 150 to 1 has been found convenient in practice. Higher ratios can be used, but are not necessary.

Untreated fumed silica (3) is used in conjunction with siloxane (2) to provide the desired thixotropy. The untreated fumed silica can be any of the known fumed silicas which have a surface area of at least 50 m$^2$/g and an untreated surface. Preferred are silicas having surface areas of greater than 200 m$^2$/g and less than 400 m$^2$/g since these are materials which are easily obtained commercially and give the desired thixotropy with the stated amounts being used. A preferred fumed silica has a surface area of from 200 to 250 m$^2$/g. The amount of fumed silica needed to provide thixotropy in conjunction with the silane (2) is about 0.24 to 1.5 percent, based upon the weight of the silicone dispersion. A preferred amount is from 0.4 to 0.6 by weight of the dispersion of the above preferred fume silica. The amount of silica used is related to the surface area, the higher surface area silicas give more thixotropy.

The composition contains aluminum trihydrate, ingredient (4), to impart electrical resistance and arc resistance to the cured coating. This ingredient is also known as aluminum hydrate or hydrated aluminum oxide. It is represented by the formula $Al_2O_3 \cdot 3H_2O$. For use in this invention, the aluminum trihydrate has an average particle size of less than 5 micrometers, preferably less than 1 micrometer. Because the particle size of the filler is small, it can be more uniformly dispersed, and the more completely it is dispersed in the composition, the more uniform and homogeneous the silicone composition becomes. It is desirable to have a homogeneous composition because it gives better results when the composition is subjected to electrical stress. The amount of aluminum trihydrate used is from 30 to 200 parts by weight. A preferred amount of aluminum trihydrate is from 100 to 150 parts by weight.

A non-reactive solvent is used to disperse the mixture of ingredients (1), (2), (3), and (4) to a viscosity suitable for spraying. A dry solvent, capable of dispersing the polydimethylsiloxane is used, such as toluene, xylene, 1,1,1-trichloroethane, or petroleum naphtha. Preferred are 1,1,1-trichloroethane and V.M.&P. naphtha. The 1,1,1-trichloroethane can be used to make dispersions which can be sprayed on electrical conductors while the conductors are energized. V.M.&P. naphtha is a refined solvent naphtha meeting ASTM specifications. It has a density of 0.85 to 0.87 and a distillation range at 760 mm: percentage recovered at 130° C. not more than 5, and percentage recovered at 145° C. not less than 90.

The amount of solvent used is that amount required to obtain the viscosity needed to operate properly in the spraying equipment being used to apply the silicone dispersion. Preferred is an amount of from 10 to 100 parts by weight, based upon 100 parts by weight of polydimethylsiloxane (1). A preferred composition uses from 60 to 100 parts by weight.

A moisture activated crosslinking system which reacts, in the presence of moisture, is used to crosslink the hydroxyl endblocked polydiorganosiloxane (1). The crosslinking system chosen must be capable of crosslinking the hydroxyl endblocked polydimethylsiloxane (1) without adversely affecting the thixotropy of the system. Moisture activated crosslinking systems which have been found suitable include mixtures which are selected from the group consisting of (A) from 5 to 30 parts by weight of silane (6) of the formula $R'_b Si(ON=X)_{4-b}$ in which R' is selected from the group consisting of monovalent hydrocarbon radicals and monovalent halohydrocarbon radicals, X is selected from the group consisting of $R''_2 C=$ and

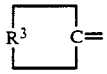

radicals in which R'' is selected from the group consisting of monovalent hydrocarbon radicals and monovalent halohydrocarbon radicals and $R^3$ is selected from the group consisting of divalent hydrocarbon radicals and divalent halohydrocarbon radicals and b is an integer from 0 to 1 inclusive, and from 0.2 to 0.5 parts by weight of a condensation catalyst for the reaction of polydiorganosiloxane (1) and silane (6), (B) a silane of the formula $R^4 Si(OAc)_3$ in an amount such that there is at least one mol of silane per mol of silicon-bonded hydroxyl, Ac is a saturated aliphatic monoacyl radical of a carboxylic acid, $R^4$ is selected from the group consisting of monovalent hydrocarbon radicals, halogenated monovalent hydrocarbon radicals, and cyanoalkyl radicals; and a carboxylic acid salt of a metal ranging from lead to manganese inclusive in the electromotive series of metals, and (C) a silane of the formula $R^5_x Si(OR^6)_{4-x}$ in which $R^5$ is a monovalent radical having less than 19 carbon atoms selected from the group consisting of hydrocarbon radicals, halohydrocarbon radicals and cyanoalkyl radicals, $R^6$ is a monovalent radical having less than 5 carbon atoms selected from the group consisting of haloaliphatic hydrocarbon radicals having no halogen atoms alpha to the oxygen atom and aliphatic hydrocarbon radicals, and x has an average value of from 0 to 1 inclusive, present in an amount of at least 1.0 mol of silane per mol of silicon-bonded hydroxyl in (1); and at least 0.1 percent by weight, based upon the weight of (1) of a titanium compound having radicals attached to the titanium atom, and valences of the Ti are satisfied by substituents selected from the group consisting of organic radicals which are attached to the titanium atom through Ti—O—C linkages, —OH and —O— of a Ti—O—Ti linkage. These and other moisture activated crosslinking systems for hydroxyl endblocked polydiorganosiloxanes are well known. However, not all known systems are suitable for use in this invention. For example, when an aminoxy based system was tried, the thixotropy of the resulting dispersion was not sufficient to be useful. The system tried used methyltris(cyclohexylamino)silane as crosslinker. When a dibutyltindilaurate catalyst was added, the system gelled. When used without the catalyst and a higher crosslinker level, gelation was avoided, but the desired degree of thixotropy was not obtained.

A preferred moisture activated crosslinking system is an oxime based system such as described above as system A. These systems are well known and are described in patents, such as U.S. Pat. No. 3,189,576, issued June 15, 1965, which patent is hereby incorporated by reference to show the cure system and how to manufacture it. In the silane (6) of the formula $R'_b Si(ON=X)_{4-b}$, R' can be a monovalent hydrocarbon radical or a halogenated monovalent hydrocarbon radical, a cyanoalkyl radical or a hydrogen atom. R' can be, for example, any alkyl radical such as the methyl, ethyl, isopropyl, tert-butyl, 2-ethylhexyl, dodecyl, 1-isobutyl-3,5-dimethylhexyl, octadecyl and myricyl radicals; any alkenyl radical such as the vinyl, allyl, decenyl, and hexadienyl radicals; an cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl, and xenyl radicals; any aralkyl radical such as the benzyl, phenylethyl, and xylyl radicals and any alkaryl radical such as the tolyl and dimethylphenyl radicals. These monovalent hydrocarbon radicals can be halogenated to give such radicals as the chloromethyl, 3,3,3-trifluoropropyl, 3,3,4,4,5,5,5-heptafluoropentyl, perchlorophenyl, 3,4-dibromocyclohexyl, α,α,α-trifluorotolyl, 2.4-dibromobenzyl, and difluoromonochlorovinyl. In addition R' can be any cyanoalkyl radical such as the beta-cyanoethyl, gamma-cyanopropyl, omega-cyanobutyl, beta-cyanopropyl, and omega-cyanooctadecyl radicals. X is selected from the group consisting of $R''_2 C=$ and $R^3 C=$ radicals. R'' is selected from the same radicals as shown above for R'. $R^3$ can be any divalent hydrocarbon radical or divalent halohydrocarbon radical in which the two valences are attached to the C or the C=N—O— group. Examples are shown in U.S. Pat. No. 3,189,576. A preferred X is $=C(CH_3)(CH_2CH_3)$. Preferred R' radicals are methyl, ethyl, or vinyl, with methyl and vinyl radical most preferred. R'' radicals are preferably methyl or ethyl. Preferred silanes are methyltris(dimethylketoxime)silane, methyltris(methylethylketoxime)silane, vinyltris(methylethylketoxime)silane, and tetra(methylethylketoxime)silane. The silane can be a single silane or mixtures of silanes. A preferred mixture is 15 percent tetra(methylethylketoxime)silane and 85 percent vinyltris(methylethylketoxime)silane.

The silane of the formula $R'_b Si(ON=X)_{4-b}$ is suitable for use in the method and composition of this invention in spite of the fact that the composition contains aluminum trihydrate which contains about 35 percent by weight of water and yet the composition, which is moisture curable, maintains a useful shelf life of at least several months to preferably greater than one year. Use of the preferred silanes allows the production of a one-package composition. This permits consistent formulation and ease of application under field conditions, whereby 2 package systems allow for error in mixing, possess limited shelf life, or limited pot life once they are mixed, and normally require heat to cure.

A condensation catalyst can be included to accelerate the rate of cure of the silicone composition on exposure to moisture. Preferably the condensation catalyst is a carboxylic acid salt of tin. Typical carboxylic acid salts include dibutyltindiacetate, stannous octoate, dibutyltindilaurate, and dibutyltin-dioctoate with dibutyltindioctoate being preferred. Catalyst amounts preferred are from 0.2 to 0.5 part by weight per 100 parts by weight of polydimethylsiloxane.

Another cure system which gives a thixotropic dispersion is system (B) above, which is based upon use of an acetoxy functional silane and carboxylic acid salt of a metal. This moisture activated cure system is well known. A description is found in U.S. Pat. No. 3,035,016, issued May 15, 1962, which patent is hereby incorporated by reference to show the cure system and its manufacture. When a silane of the formula $R^4Si(OAc)_3$ in amount such that there is at least one mol of silane per mol of silicon-bonded hydroxyl is mixed with a hydroxyl endblocked polydiorganosiloxane, in the absence of moisture, reaction occurs spontaneously to give an acyloxy endblocked polymer. When exposed to moisture, the endblocks react to give crosslinking. $R^4$ can be any of the groups described above for $R''$, with methyl being the preferred radical. Ac can be any saturated aliphatic monoacyl radical such as propionyl, butyryl, hexoyl, 2-ethylhexoyl, octanoyl, isovaleryl, and stearyl. The preferred radical is acetoxy with the preferred silanes being methyltriacetoxysilane and vinyltriacetoxysilane. An improved system is described in U.S. Pat. No. 3,077,465, issued Feb. 12, 1963, is which a carboxylic acid salt of a metal ranging from lead to manganese inclusive in the electromotive series of metals is added to aid cure in the presence of very moist air. This patent is included by reference to show this catalyst and its method of manufacture. The preferred catalyst is dibutyltindilaurate.

Another moisture activated cure system is system (C) described above. This system is further described in U.S. Pat. No. 3,294,739, issued Dec. 27, 1966, which is hereby incorporated by reference to show the cure system and its method of manufacture. This system uses the silane of the formula $R^5_xSi(OR^6)_{4-x}$ in which $R^5$ is a monovalent radical having less than 19 carbon atoms selected from the group consisting of hydrocarbon radicals, halohydrocarbon radicals and cyanoalkyl radicals. Preferred radicals for $R^5$ are as described above for $R''$. Preferred are methyl radicals. $R^6$ is a monovalent radical having less than 5 carbon atoms selected from the group consisting of haloaliphatic hydrocarbon radicals having no halogen atoms alpha to the oxygen atom and aliphatic hydrocarbon radicals such as methyl, ethyl, propyl, butyl, beta-chloroethyl, delta-chlorobutyl, beta-bromopropyl, and 3,3,3-trifluoropropyl. A preferred silane is methyltrimethoxysilane. The silane is present in an amount of at least 1.0 mol of silane per mol of silicon-bonded hydroxyl in (1). The system also includes at least 0.1 percent by weight, based upon the weight of (1) of a titanium compound having radicals attached to the titanium atom, and valences of the Ti are satisfied by substituents selected from the group consisting of organic radicals which are attached to the titanium atom through Ti—O—C linkages, —OH and —O— of a Ti—O—Ti linkage. A large number of titanium catalysts are described in the referenced U.S. Pat. No. 3,294,739. Preferred are tetrabutyltitanate and 2,5-diisopropoxy-bis-ethylacetoacetate titanium.

Also permitted are ingredients such as pigments, other fillers in minor amounts, and other ingredients commonly used in silicone compositions provided that the final composition is tested to assure that these other additional ingredients do not degrade the electrical properties of the cured composition or harm the thixotropic nature of the dispersion.

The following examples are included for illustrative purposes only and should not be construed as limiting the invention which is properly set forth in the appended claims. Parts are parts by weight. Amounts shown in parentheses ( ) are amounts in parts by weight based upon 100 parts by weight of polydimethylsiloxane (1).

EXAMPLE 1

A series of silicone dispersions were prepared by first adding 30.65 (100) parts of a hydroxyl endblocked polydimethylsiloxane having a viscosity of about 12 Pa.s at 25° C. and with about 15 mole percent of the ends being trimethylsiloxy endblocked (ingredient 1) to a container, then adding the amount of siloxane (2) shown below in Table I and mixing until dispersed. The siloxane (2) was hydroxyl endblocked polymethylphenylsiloxane having a viscosity of about 0.5 Pa.s at 25° C. and about 4.5 weight percent silicon-bonded hydroxyl radicals. Then the amount of an untreated fumed silica having a surface area of about 200 m²/g shown in the Table was stirred in until well dispersed. Next 40.8 (133) parts of finely divided aluminum trihydrate was stirred into the mixture. This mixture was then given three passes through a three roll mill to assure a uniform dispersion of the ingredients, giving a uniform paste material. This material was then dispersed into sufficient 1,1,1-trichloroethane to give a 74 percent by weight solids dispersion. The dispersion was then placed in a sealed container and 6.1 (19.9) parts of methyl-tris(methylethylketoxime)silane was added without exposure to moisture, followed by 0.25 (0.8) part of dibutyltindi-2-ethylhexoate, to give the final dispersion.

The viscosity of the silicone dispersion was measured at different rates of shear on a Brookfield Model HATD viscometer, using a Number 6 spindle. The results are shown in Table I.

TABLE I

| Rate, rpm | 2.5 | 5.0 | 10. | 20. | 50. | 100. | 50. | 20. | 1.0 | 5.0 | 2.5 |
|---|---|---|---|---|---|---|---|---|---|---|---|
| Mixture | | | | | Viscosity, Pa.s | | | | | | |
| A | 2.0 | 2.52 | 2.56 | 2.6 | 2.2 | — | — | — | — | — | — |
| B | 24.8 | 27.2 | 27.8 | 24.3 | 19.1 | 17.3 | 19.3 | 24.5 | 31.2 | 39.2 | 35.2 |
| C | 88.8 | 57.6 | 40.0 | 27.9 | 19.1 | 15.5 | 19.2 | 26.7 | 37.0 | 54.8 | 88.0 |
| D | 165. | 107. | 77.0 | 47.2 | 23.7 | 17.6 | 25.2 | 42.1 | 73.0 | 82.8 | 128. |

A = zero parts silica, zero parts phenyl silicone
B = 0.23 (0.78) parts silica 0.35 (1.13) parts phenyl silicone
C = 0.46 (1.60) parts silica 0.71 (2.30) parts phenyl silicone
D = 0.82 (2.84) parts silica 1.18 (3.85) parts phenyl silicone As the amount of fume silica which has been treated by the phenyl silicone is increased, the thixotropic nature of the silicone dispersion increases. The amount of treated fume silica which is added is limited on the upper value by the viscosity of the dispersion. If too much is added, the dispersion can not be properly sprayed.

The above series of silicone dispersions were then made into samples for physical property testing by forming slabs of approximately 0.060 inches thickness and curing for 7 days at 50 percent relative humidity and 25° C. The durometer was tested in accordance with ASTM D 2240, the tensile strength, modulus, and elongation in accordance with ASTM D 412, and the tear in accordance with ASTM D 624. The results obtained are shown in Table II.

TABLE II

| Mixture | Durometer Shore A | Tensile Strength psi | Elongation percent | Modulus 50% psi | | Tear 100% ppi |
| --- | --- | --- | --- | --- | --- | --- |
| A | 55 | 325 | 107 | 192 | 302 | 37 |
| B | 60 | 252 | 60 | 229 | — | 28 |
| C | 68 | 291 | 71 | 246 | — | 46 |
| D | 75 | 228 | 75 | 211 | — | 59 |

As the amount of fume silica (3) treated with the phenyl siloxane (2) is increased, the durometer increases, the tensile strength and elongation decrease, and the tear strength increases.

EXAMPLE 2

A comparative composition was prepared in which the base mixture before catalyzation was heated under vacuum to eliminate any volatile materials. The method mixed 34.7 (100) parts of the polydimethylsiloxane (1) of Example 1, with 0.8 (2.3) part of the phenyl siloxane (2), then 0.56 (1.6) of the fume silica (3), followed by 46.2 (133) parts of the aluminum hydrate (4). This base was then heated under a vacuum of 25 inches of mercury at a temperature of 160° C. for a period of 1.5 hours. After cooling, it was dispersed with 34.6 parts of 1,1,1-trichloroethane. This dispersion was then mixed in the absence of atmospheric moisture with 5.5 (15.8) parts of methyltris(methylethylketoximo)silane and 0.2 (0.6) part of dibutyltindioctoate. The viscosity characteristics of this comparative composition were determined by measuring viscosity under different shear conditions as in Example I with the results shown in Table III.

TABLE III

| Rate, rpm | 2.5 | 5.0 | 10. | 20. | 50. | 100. | 50. | 20. | 10 | 5.0 | 2.5 |
| --- | --- | --- | --- | --- | --- | --- | --- | --- | --- | --- | --- |
| Viscosity, Pa.s | 7.2 | 8.0 | 8.2 | 8.2 | 8.0 | 7.8 | 7.9 | 7.8 | 7.8 | 8.4 | 8.0 |

The results shown in Table III show that the process used in Example 2 does not give the results obtained by following the process of this invention.

EXAMPLE 3

A composition was prepared by mixing 100 parts of the polydimethylsiloxane of Example 1 with 2.42 part of the phenylsiloxane (2), then 1.52 parts of the fume silica, followed by 133 parts of the aluminum hydrate. This base was mixed under a vacuum of 600 mm of mercury, keeping the temperature below 54° C. It was then dispersed with 65.7 parts of 1,1,1-trichloroethane. This dispersion was then mixed in the absence of atmospheric moisture with 15.8 parts of methyltris(methylethylketoxime)silane and 0.6 part of dibutyltindioctoate. The viscosity characteristics were as follows:

| rpm | 2.5 | 5 | 10 | 20 | 50 | 100 | 50 | 20 | 10 | 5 | 2.5 |
| --- | --- | --- | --- | --- | --- | --- | --- | --- | --- | --- | --- |
| Viscosity, Pa.s | 155.2 | 97.6 | 40 | 27.1 | 17.1 | 12.5 | 17.0 | 26.4 | 38.8 | 60.4 | 95.2 |

The dispersion, when spread on a surface, formed a skin (skin over time) in 7 minutes and became tack free when touched (tack free time) in 14 minutes. When allowed to cure for 7 days, a slab about 0.60 inch thick had a durometer of 72, a tensile strength of 245 psi, an elongation of 73 percent, and a tear of 67.

EXAMPLE 4

A base composition was prepared by mixing 2980 gms. of the hydroxyl endblocked polydimethylsiloxane of Example 1 and 72 grams of the hydroxyl endblocked polymethylphenylsiloxane fluid of Example 1. The mixer was inerted with nitrogen and the ingredients mixed until creamy (2-3 minutes). Then 45 grams of the untreated fumed silica of Example 1 was added, and the mixer inerted again. The filler was wet out and mixed for 5 minutes with the disperser at 1000 rpm and the agitator at its lowest speed. Cooling water was then turned on and 3951 grams of the aluminum trihydrate of Example 1 was added in 800 gram increments. After each addition the mixer was inerted and the filler then wet out. After all of the aluminum trihydrate had been added, the mixture was mixed for 30 minutes with the blade speeds set as before. Then 1953 gms of 1,1,1-trichloroethane was added, the mixer inerted and the contents mixed for 5 minutes with the same blade speeds.

The base was then divided into 4, approximately equal portions. Each portion was then mixed with a moisture activated crosslinking system. System A was 100 parts by weight of the base, 6.68 parts of a mixture of 85 percent by weight vinyltri(methylethylketoxime)silane and 15 percent tetra(methylethylketoxime)silane, and 0.26 part of dibutyltindilaurate. System B was 100 parts of the base, 4.70 parts of a mixture of 50 percent by weight methyltriacetoxysilane and 50 percent by weight ethyltriacetoxysilane, and 0.05 part of dibutyltindilaurate. System C was 100 parts of the base, 2.71 parts of methyltrimethoxysilane, and 0.43 part of tetrabutyltitanate. In each of these cure systems, the crosslinker/catalyst mixture was added under a nitrogen atmosphere, blended in with a spatula and then placed on a can roller for 4 hours. System D was 100 parts of the base and 6.99 parts of methyl-tris(cyclohexylamino)silane. This system was mixed by placing the base into a sealant tube, then adding and mixing without contact to any moisture the crosslinker. When a mixture of methyl-tris(cyclohexylamino)silane/DBTDL at the same molar ratio as the other systems was used, the sample gelled. Small samples made by hand at this crosslinker level, without DBTDL, did not gel. However, in order to insure that gelation didn't occur, in the samples for evaluation the crosslinker level was increased by 50 percent and DBTDL was not used to give the mixture described above.

Another base was prepared as above, but using hydroxyl endblocked methyl(trifluoropropyl)polysiloxane having a viscosity of about 0.1 Pa.s at 25° C. and about 6 weight percent hydroxyl radicals as the siloxane (2) in place of the hydroxylated polymethylphenylsiloxane. This base was catalyzed in the same manner as above.

The viscosity of each of the moisture curable dispersions was then measured in the same manner as in Example 1, with the results shown in Table IV.

TABLE IV

| Rate, | 2.5 | 5.0 | 10 | 20 | 50 | 100 | 50 | 20 | 10 | 5.0 | 2.5 |
|---|---|---|---|---|---|---|---|---|---|---|---|
| System | | | | | Viscosity, Pa.s | | | | | | |
| | Base A | | | | | | | | | | |
| A* | 160 | 90 | 54 | 33 | 21.2 | 15.3 | 21.2 | 35 | 53 | 82 | 144 |
| B** | 1088 | 528 | 296 | 170 | 86.4 | 45.6 | 80 | 136 | 216 | 360 | 624 |
| C* | 128 | 84 | 60 | 42.5 | 31 | — | 31 | 44 | 61 | 90 | 140 |
| D* | 16 | 16 | 15 | 14.5 | 15 | 12.3 | 13.8 | 13.5 | 14 | 16 | 16 |
| | Base B | | | | | | | | | | |
| A* | 60 | 40 | 28 | 19 | 14 | 11.2 | 13.8 | 19 | 27 | 40 | 60 |
| B** | 512 | 304 | 180 | 110 | 60.8 | 40 | 56 | 100 | 156 | 264 | 448 |
| C** | 160 | 104 | 80 | 58 | 43.2 | 36.4 | 40.8 | 52 | 68 | 96 | 144 |
| D* | 16 | 18 | 22 | 30 | 19.2 | 16.8 | 18.6 | 19 | 19 | 20 | 20 |

| Cure Type | Base | TFT (min) | Duro. | Tensile | Elongation | Modulus | Tear |
|---|---|---|---|---|---|---|---|
| System A | A | 13.3 | 70 | 175 | 42 | 151 | 22.1 |
| System B | A | 6.8 | — | — | — | — | — |
| System C | A | 60.0 | 54 | 266 | 84 | 104 | 29.7 |
| System D | A | 8.25 | 66 | 303 | 65 | 106 | 21.7 |
| System A | B | 12.0 | 71 | 183 | 60 | 115 | 22.4 |
| System B | B | 8.5 | 60 | — | — | 85 | 27.1 |
| System C | B | >90.0+ | 60 | 239 | 86 | 64 | 32.4 |
| System D | B | 7.0 | 53 | 285 | 64 | 61 | 28.5 |

*#6 spindle
**#7 spindle
TFT-tack free time, minutes
Duro.-durometer, Shore A
Tensile-tensile strength at break, psi
Elongation-elongation at break, percent
Modulus-modulus at 10 percent elongation
Tear-tear strength, ppi
+ <360

That which is claimed is:

1. A method of making a thixotropic silicone dispersion consisting essentially of
   (A) mixing
      (1) 100 parts by weight of a hydroxyl endblocked polydimethylsiloxane having a viscosity of from 5 to 20 Pa.s at 25° C. with
      (2) a siloxane of the formula

where R is methyl or phenyl radical, A is phenyl or 3,3,3-trifluoropropyl radical, x is from 3 to 20, y is from 0 to 17, and at least 30 percent of the total organic radicals are A, the amount used being sufficient to give from 0.25 to 2.5 part of siloxane (2) per part of silica (B), then (B) admixing from 0.24 to 1.5 weight percent, based upon the final weight of the silicone dispersion, of (3) untreated fumed silica, then
(C) admixing from 30 to 200 parts by weight of (4) finely ground aluminum trihydrate powder, then
(D) admixing from 10 to 100 parts by weight of (5) non-reactive solvent to disperse the mixture, then
(E) admixing in the absence of moisture, a moisture activated crosslinking system for polydimethylsiloxane (1) which does not destroy the thioxotropic nature of the dispersion.

2. The method of claim 1 in which the moisture activated crosslinking system for the polydimethylsiloxane (1) consists essentially of a mixture selected from the group consisting of
   (A) from 5 to 30 parts by weight of silane (6) of the formula $$R'_b Si(ON=X)_{4-b}$$

in which R' is selected from the group consisting of monovalent hydrocarbon radicals and monovalent halohydrocarbon radicals, X is selected from the group consisting of R"$_2$C= and

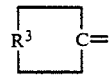

radicals in which R" is selected from the group consisting of monovalent hydrocarbon radicals and monovalent halohydrocarbon radicals and R$^3$ is selected from the group consisting of divalent hydrocarbon radicals and divalent halohydrocarbon radicals and b is an integer from 0 to 1 inclusive, and from 0.2 to 0.5 part by weight of a condensation catalyst for the reaction of polydiorganosiloxane (1) and silane (6), (B) a silane of the formula $R^4Si(OAc)_3$ in amount such that there is at least one mol of silane per mol of silicon-bonded hydroxyl, Ac is a saturated aliphatic monoacyl radical of a carboxylic acid, $R^4$ is selected from the group consisting of monovalent hydrocarbon radicals, halogenated monovalent hydrocarbon radicals, and cyanoalkyl radicals; and a carboxylic acid salt of a metal ranging from lead to manganese inclusive in the electromotive series of metals, (C) a silane of the formula $R^5{}_xSi(OR^6)_{4-x}$ in which $R^5$ is a monovalent radical having less than 19 carbon atoms selected from the group consisting of hydrocarbon radicals, halohydrocarbon radicals and cyanoalkyl radicals, $R^6$ is a monovalent radical having less than 5 carbon atoms selected from the group consisting of haloaliphatic hydrocarbon radicals having no halogen atoms alpha to the oxygen atom and aliphatic hydrocarbon radicals, and x has an average value of from 0 to 1 inclusive, present in an amount of at least 1.0 mol of silane per mol of silicon-bonded hydroxyl in (1); and at least 0.1 percent by weight, based upon the weight of (1) of a titanium compound having radicals attached to the titanium atom, and valences of the Ti are satisfied by substituents selected from the group consisting of organic radicals which are attached to the titanium atom through Ti—O—C linkages, —OH and —O— of a Ti—O—Ti linkage.

3. A method of making a thixotropic silicone dispersion consisting essentially of
(A) mixing
(1) 100 parts by weight of a hydroxyl endblocked polydimethylsiloxane having a viscosity of from 5 to 20 Pa.s at 25° C. with
(2) a siloxane of the formula

where R is methyl or phenyl radical, A is phenyl or 3,3,3-trifluoropropyl radical, x is from 3 to 20, y is from 0 to 17, and at least 30 percent of the total organic radicals are A, the amount used being sufficient to give from 0.25 to 2.5 part of siloxane (2) per part of silica (B), then
(B) admixing from 0.24 to 1.5 weight percent, based upon the final weight of the silicone dispersion, of
(3) untreated fumed silica, then
(C) admixing from 30 to 200 parts by weight of (4) finely ground aluminum trihydrate powder, then
(D) admixing from 10 to 100 parts by weight of (5) non-reactive solvent to disperse the mixture, then
(E) admixing in the absence of moisture, a moisture activated crosslinking system for polydimethylsiloxane (1) consisting of from 5 to 30 parts by weight of silane (6) of the formula $R'_bSi(ON\!\!=\!\!X)_{4-b}$ in which R' is selected from the group consisting of monovalent hydrocarbon radicals and monovalent halohydrocarbon radicals, X is selected from the group consisting of $R''_2C\!\!=\!\!$ and

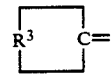

radicals in which R" is selected from the group consisting of monovalent hydrocarbon radicals and monovalent halohydrocarbon radicals and $R^3$ is selected from the group consisting of divalent hydrocarbon radicals and divalent halohydrocarbon radicals and b is an integer from 0 to 1 inclusive, and optionally from 0.2 to 0.5 part by weight of a condensation catalyst for the reaction of polydiorganosiloxane (1) and silane (6),
to give a dispersion which can be stored in the absence of moisture, which can be spray applied to vertical surfaces without runoff, and which cures upon exposure to the air into a silicone elastomer.

4. The method of claim 1 in which the polydimethylsiloxane (1) has a viscosity of from 10 to 14 Pa.s at 25° C.

5. The method of claim 4 in which the siloxane (2) has y equal to zero and x is such that the viscosity is about 0.5 Pa.s at 25° C.

6. The method of claim 5 in which the fume silica (3) has a surface area of from 200 to 250 m²/g and is present in an amount of from 0.4 to 0.6 percent by weight of the dispersion.

7. The method of claim 6 in which there is present from 0.5 to 2.5 parts of siloxane (2) per part of fume silica (3).

8. The method of claim 7 in which there is present from 60 to 100 parts of solvent (5).

9. The method of claim 8 in which the solvent is 1,1,1-trichloroethene.

10. The method of claim 8 in which the solvent is high flash V M and P naphtha.

11. A thixotropic silicone dispersion made by the method of claim 1.

12. The dispersion of claim 11 in which the moisture activated crosslinking system for the polydimethylsiloxane (1) consists essentially of a mixture selected from the group consisting of
(A) from 5 to 30 parts by weight of silane (6) of the formula $R'_bSi(ON\!\!=\!\!X)_{4-b}$ in which R' is selected from the group consisting of monovalent hydrocarbon radicals and monovalent halohydrocarbon radicals, X is selected from the group consisting of $R''_2C\!\!=\!\!$ and

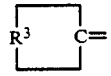

radicals in which R" is selected from the group consisting of monovalent hydrocarbon radicals and monovalent halohydrocarbon radicals and $R^3$ is selected from the group consisting of divalent hydrocarbon radicals and divalent halohydrocarbon radicals and b is an integer from 0 to 1 inclusive, and from 0.2 to 0.5 part by weight of a condensation catalyst for the reaction of polydiorganosiloxane (1) and silane (6), (B) a silane of the formula $R^4Si(OAc)_3$ in amount such that there is at least one mol of silane per mol of silicon-bonded hydroxyl, Ac is a saturated aliphatic monoacyl radical of a carboxylic acid, $R^4$ is selected from the group consisting of monovalent hydrocarbon radicals, halogenated monovalent hydrocarbon radicals, and cyanoalkyl radicals; and a carboxylic acid salt of a metal ranging from lead to manganese inclusive in the electromotive series of metals.

(C) a silane of the formula $R^5_xSi(OR^6)_{4-x}$ in which $R^5$ is a monovalent radical having less than 19 carbon atoms selected from the group consisting of hydrocarbon radicals, halohydrocarbon radicals and cyanoalkyl radicals, $R^6$ is a monovalent radical having less than 5 carbon atoms selected from the group consisting of haloaliphatic hydrocarbon radicals having no halogen atoms alpha to the oxygen atom and aliphatic hydrocarbon radicals, and x has an average value of from 0 to 1 inclusive, present in an amount of at least 1.0 mol of silane per mol of silicon-bonded hydroxyl in (1); and at least 0.1 percent by weight, based upon the weight of (1) of a titanium compound having radicals attached to the titanium atom, and valences of the Ti are satisfied by substances selected from the group consisting of organic radicals which are attached to the titanium atom through Ti—O—C linkages, —OH and —O— of a Ti—O—Ti linkage.

13. A thixotropic silicone dispersion made by the method of claim 3.

* * * * *